US006613098B1

(12) United States Patent
Sorge et al.

(10) Patent No.: US 6,613,098 B1
(45) Date of Patent: Sep. 2, 2003

(54) STORAGE OF APPLICATION SPECIFIC DATA IN HTML

(75) Inventors: Terri L. Sorge, Kirkland, WA (US); Kevin J. Fischer, Redmond, WA (US); Anna V. Timasheva, Bellevue, WA (US); Russell S. Johnson, Seattle, WA (US); Rajeev S. Misra, Redmond, WA (US); Juha Niemisto, Mercer Island, WA (US); Robert W. Coffen, Redmond, WA (US); Ramakrishnan Natarajan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,815

(22) Filed: Jun. 15, 1999

(51) Int. Cl.[7] .............................................. G06F 17/00
(52) U.S. Cl. ........................ 715/503; 715/504; 715/513; 715/522
(58) Field of Search ............................ 715/513, 501.1, 715/503, 504, 522

(56) References Cited

U.S. PATENT DOCUMENTS

| | | | | | |
|---|---|---|---|---|---|
| 5,860,073 | A | * | 1/1999 | Ferrel et al. ................. | 715/522 |
| 6,078,924 | A | * | 6/2000 | Ainsbury et al. ............ | 707/101 |
| 6,182,092 | B1 | * | 1/2001 | Francis et al. ............... | 715/513 |
| 6,230,173 | B1 | * | 5/2001 | Ferrel et al. ................. | 715/513 |
| 6,396,500 | B1 | * | 5/2002 | Qureshi et al. .............. | 345/473 |
| 6,456,308 | B1 | * | 9/2002 | Agranat et al. .............. | 345/854 |

OTHER PUBLICATIONS

"Microsoft Office Breaks Ground By Adopting HTML Standard as File Format" Dec. 15, 1997, http://xml.coverpages.org/microsoftHTML971215.html.*

Moseley, Mastering Microsoft Office 97 Professional Edition, Second Edition, © 1997, pp. 531, 1031–1041.*

Young, "Cascading Style Sheets in Internet Explorer 4," Oct. 15, 1997 http://msdn.microsoft.com/library/default.asp?url=/library/en–us/dnie40/html/css–ie4.asp.*

Radosevich, "XML runs for Office" Infoworld, v19, n48, Dec. 1 1997, pp 1,24.*

* cited by examiner

Primary Examiner—Heather R. Herndon
Assistant Examiner—Adam Queler
(74) Attorney, Agent, or Firm—Ronald M. Anderson

(57) ABSTRACT

A spreadsheet program saves data into a hypertext markup language (HTML) document that can be viewed with a browser program, but persists all of the information associated with that data necessary to maintain formatting and functionality of the data if reintroduced into the spreadsheet program. The HTML document can then be used both for displaying the data over the Internet or other network in a browser program, and also for opening the data in the spreadsheet program. The information necessary for preserving the format and functionality of the data in the spreadsheet program is incorporated into the HTML document using HTML, Cascading Style Sheets (CSS), and Extended Markup Language (XML). HTML is used for expressing cell data information that is displayed in the browser program, CSS are used for expressing cell-level properties of the data, and XML is used for expressing information that is not displayed in the browser program, but which is necessary for some functionality of the data when used in the spreadsheet program. If any formatting of the data are changed to enable display of the data in the browser program as displayed in the spreadsheet program, the original formatting information is retained in a supporting file that is ignored by a browser program.

36 Claims, 4 Drawing Sheets

STORAGE OF APPLICATION SPECIFIC DATA IN HTML

FIELD OF THE INVENTION

The present invention generally pertains to a method for storing non-HTML information related to a table of data in an HTML document so that the table of data are displayed in a browser program, and more specifically, to a method for enabling an HTML document to contain all the information related to a table of data that is required by a spreadsheet application to manipulate that table of data.

BACKGROUND OF THE INVENTION

With the widespread use of the Internet and of corporate or business intranets, it is becoming increasingly common to translate data from application-specific file formats into HTML file formats, to enable the data to be readily transmitted as a web page and viewed with browser programs. HTML documents or files have thus become the universally accepted format for sharing data "on-line."

An HTML document includes a hierarchical set of markup elements; most elements have a start tag, followed by content, followed by an end tag. The content is typically a combination of text and nested markup elements. Tags, which are enclosed in angle brackets ('<' and '>'), indicate how the document is structured and how to display the document, i.e., its format. There are tags for markup elements such as titles and headers, for text attributes such as bold and italic, for lists, for paragraph boundaries, for links to other documents or other parts of the same document, for graphic images, for non-displayed comments, and for many other features. Further details regarding HTML may be found in reference books such as "HTML For Dummies," by Ed Tittel and Steve James (1996).

The following lines of HTML briefly illustrate how the language is used:

Here we start a new paragraph <P>.
Some words are <B>bold</B>, others are <I>italic</I>.
The viewer of the document will see:
Here we start a new paragraph.
Some words are bold, others are italic.

As noted above, a user who wishes to retrieve and display an HTML document generally uses a Web browser program. Two of the more popular Web browser programs are NAVIGATOR™ from NetScape Communications Corp. of Mountain View, Calif., and INTERNET EXPLORER™ from Microsoft Corporation of Redmond, Wash. The primary functionality of web browsers is directed to finding, retrieving, and displaying documents. A browser program is generally not intended for word processing or data manipulation of the information contained within an HTML document, but can display documents or data generated by word processing or spreadsheet applications, once converted into an appropriate HTML compatible format.

A wide variety of data may be shared among different users in a network environment using HTML. Typical HTML documents include images, text, and data. HTML documents can be created using programs specifically designed for that purpose, such as Microsoft Corporation's FRONTPAGE™ Web Page publishing program. Additionally, some applications, such as Microsoft Corporation's WORD™ word processing program, allow a user to save a text document as an HTML document. Microsoft Corporation's EXCEL 97™ spreadsheet program also enables a user to save a data table or chart created in a workbook as an HTML file.

A characteristic of many applications is the use of specific formatting of data in a manner that is unique to some functionality of the application. Generally, some or all of this type of information is lost when the data are translated into HTML. If the data being translated is a table generated by a spreadsheet application, HTML has been very useful in enabling computer network users to view the table with a browser program. However, in the past, users have not been able to manipulate the data presented in a table, since browser programs have not supported such functionality. In addition, the table in the HTML document could not be restored to the original spreadsheet application, since not all of the information originally associated with the table when it was created with the spreadsheet application would have been retained in the HTML document.

To ensure that a data table translated into HTML might thereafter be available for use and manipulation in the spreadsheet program, it has been necessary to save both a file in the original spreadsheet format, and the HTML file in which the table from the spreadsheet was inserted. Often, a table created in a spreadsheet contains information that changes regularly (monthly sales reports, year-to-date profit figures, etc.), and these changes need to be entered in the HTML document to be available for view with a browser program. To accomplish this task, it was previously necessary to manage and update both files—the spreadsheet file and the HTML file. To improve efficiency and productivity with which this task is accomplished, it would be desirable to include the functionality of a table created in a spreadsheet with the table after it is exported to an HTML document from the spreadsheet application, so that only the HTML file need be maintained. In this way, the table could be reintroduced into the spreadsheet program from the HTML document with all its original formatting and functionality intact, and network users would always have access to the most current table.

When a data table is created in a spreadsheet application, some of the information associated with the table and its functionality has no equivalent in HTML. For example, a formula relating to the manipulation of the data in a cell of the spreadsheet will not be readily conveyed by HTML. It would be desirable to include such information in an HTML document, so that the information is ignored when the HTML document is viewed by a browser program, yet is available to be used by the spreadsheet application if the table is imported from the HTML document and opened in the spreadsheet program.

Some of the information associated with a data table created in a spreadsheet program is related to similar information in HTML, but the information is used and stored differently in HTML than in the spreadsheet program format. An example of this arises in connection with the formatting and layout of a data table. Often spreadsheets employ formatting functionality that does not have a direct correspondence with formatting of the data table in HTML. In a spreadsheet program, a user can apply number formatting that displays a value in red if the value of the data in a cell is negative. A user can also arbitrarily change the color of a font for a cell to red. When a data table is translated into an HTML document, all of the cells with data shown as red will be displayed in HTML with a red font. However, HTML does not have the ability to associate the number formatting with a cell, or to distinguish those cells with values displayed in red because they are negative from cells in which the font is arbitrarily chosen to be red. If a cell value changes from negative to positive, the value in the cell should no longer be displayed in a red font, but HTML cannot make that determination, since it does not provide a way to save the number formatting rule for negative value data. It would be desirable to preserve such spreadsheet-specific functional formatting information within an HTML document, so that the information is available if the table is export from HTML document back into the spreadsheet program.

Currently, no prior art technique exists that enables virtually all function and formatting information to be preserved when a data table is exported from a spreadsheet into an HTML document, so that the information can be employed by the spreadsheet program if it becomes necessary to "round trip" the information back into a spreadsheet format file. The preservation of the functionality and formatting information associated with the spreadsheet formatted file when a data table is exported into: an HTML document should not adversely impact the functionality of the HTML document to view the data in a browser program.

SUMMARY OF THE INVENTION

In accord with the present invention, a method is defined for saving data having a format and functionality specific to a parent spreadsheet program into a hypertext markup language (HTML) format, such that the data are viewable by a browser program, and that all formatting information that was originally associated with the data within the parent spreadsheet program is also included within the HTML format, so that the data in the HTML format can be reintroduced into the parent spreadsheet program without loss of the format and functionality that the data previously exhibited in the parent spreadsheet program.

The method includes first enabling a user to select the data to be translated, from within the parent spreadsheet program and then incorporating the data from the parent spreadsheet program into an HTML document. Incorporating the data into the HTML document is accomplished by using HTML to represent data that will be displayed in a browser program, using Cascading Style Sheets (CSS) to represent cell-level properties of the data, using Extended Markup Language (XML) to represent information required for proper functionality in the parent spreadsheet program, but which is not required for the display of the data in a browser program, and saving the representations of the data in HTML, CSS, and XML in at least one file.

In one embodiment, the step of incorporating the data from the parent spreadsheet program into an HTML document further includes generating multiple files to define the HTML document. When the spreadsheet data includes multiple data tables, the method includes generating a separate file for each data table. A frame set is generated that includes a navigation file, which has links to each file representing a different data table.

In another embodiment, the method includes generating at least one supporting file. A supporting file can include information required for proper functionality in the parent spreadsheet program, but which is not required for the display of the data in a browser program, in either a binary format or an XML format. The supporting file can include image data in an image file. An additional type of supporting file is a CSS file that includes cell-level properties of the data.

In one embodiment, the XML used to represent information required for proper functionality in the parent spreadsheet program can define document-level properties of the data in the parent spreadsheet program, or the parameters of the last data sort that was executed in the parent spreadsheet program.

The XML and CSS used to incorporate the data into the HTML document can be included as separate linked files, or can be included within the header section of the HTML document. PivotTable data saved as XML-Data is always saved as a separate file. CSS are used to define cell-level properties including fonts, backgrounds, colors, number formatting, borders, the alignment of the data within the cell, etc. One embodiment includes the step of creating a new CSS property if a cell property of the spreadsheet data does not correspond to an existing CSS property. The MSO-Ignore property is one example of a newly created property.

In one embodiment, HTML is used to represent cell-level properties instead of using CSS, when that property is unique to a small number of cells, and using HTML would reduce the amount of code required. In another embodiment, to ensure that the appearance of the data displayed in a browser program will match the appearance of the data as displayed in the parent spreadsheet program, the HTML formatting has to be changed from the parent spreadsheet program formatting. When this is done, the original formatting of the data in the parent spreadsheet program is also incorporated into the HTML document, such that the original formatting is ignored by a browser program, but available to be used by the parent spreadsheet program to recreate the original formatting when the data from the HTML document is reintroduced into the parent spreadsheet program. This can be accomplished by including the MSO-Ignore property with the changed formatting; so when the data from the HTML document is reintroduced into the parent spreadsheet program the changed formatting indicated by the MSO-Ignore property is ignored by the parent spreadsheet program, and the original formatting information incorporated into the HTML document is used instead. If the original formatting is a cell-level property, that original formatting is incorporated into the HTML document using CSS. If the original formatting information is document-level or range-level formatting or functionality, that original information is incorporated into the HTML document using XML.

An alternate method for saving data created in a spreadsheet program into an HTML document, so that the data can be displayed in a browser program, and so that all the formatting information required for full functionality of the data within the spreadsheet program are preserved within the HTML document, regardless of whether that information is required for the display of the data in a browser program, is also provided. The steps include first enabling a user to select the data within the spreadsheet program to be saved; and then separating the data into groups. A first group is data that is not displayable by a browser program but which is required for some functionality related to the data within the spreadsheet program, a second group is data that is displayable by a browser program with an appearance that is substantially identical to that of the data when displayed by the spreadsheet program, and a third group is data that is displayable by a browser program, but requiring a formatting change so the appearance of the data when displayed by a browser program will be substantially identical to that of the data when displayed by the spreadsheet program.

The first group of data are incorporated into the HTML document using XML, so that the first group of data are ignored when the HTML document is displayed by a browser program, but is preserved and thus available to be used to reintroduce the first group of data from the HTML document into the spreadsheet program.

The second group of data are incorporated into the HTML document using HTML, such that cell-level properties of the data are incorporated into the HTML document using CSS, when an amount of code required to incorporate the second group of data into the HTML document can be reduced by the use of CSS. Alternately, cell-level properties of the data are incorporated into the HTML document using HTML tags or attributes, when an amount of code required to incorporate the second group of data into the HTML document can be reduced by the use of HTML instead of CSS.

The third group of data are incorporated into the HTML document using HTML such that the formatting change required from a first format associated with the display of the data by the spreadsheet program to a second format associated with display of the data by a browser program includes a marker associated with the formatting change. Information related to the first format is incorporated into the HTML document, such that the first format information is ignored when the HTML document is displayed by a browser program, but is preserved and thus available to be used to reintroduce the third group of data from the HTML document into the spreadsheet program and to recreate the first format. Cell-level properties of the data are incorporated into the HTML document using CSS, when an amount of code required to incorporate the second group of data into the HTML document can be reduced by the use of CSS. Cell-level properties of the data are incorporated into the HTML document using HTML tags or attributes, when an amount of code required to incorporate the second group of data into the HTML document can be reduced by the use of HTML instead of CSS.

The final step of the alternate method is saving the HTML document incorporating the first group of data, the second group of data and the third group of data in at least one file, said at least one file including the HTML document.

Another aspect of the present invention is directed to an article of manufacture that includes a medium in which machine instructions are stored that cause a computer to implement functions generally consistent with the steps of the method discussed above.

A still further aspect of the present invention is directed to a system for enabling an HTML document to support both the display of data parented in a spreadsheet program in a browser program as well as the opening that data, with its original formatting and functionality intact, in the spreadsheet program. This system includes a memory in which a plurality of machine instructions are stored, a display, and a process coupled to the memory and the display. The processor executes the machine instructions to implement the spreadsheet program with functions that are generally consistent with the steps of the method discussed above.

BRIEF DESCRIPTION OF THE DRAWINGS FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
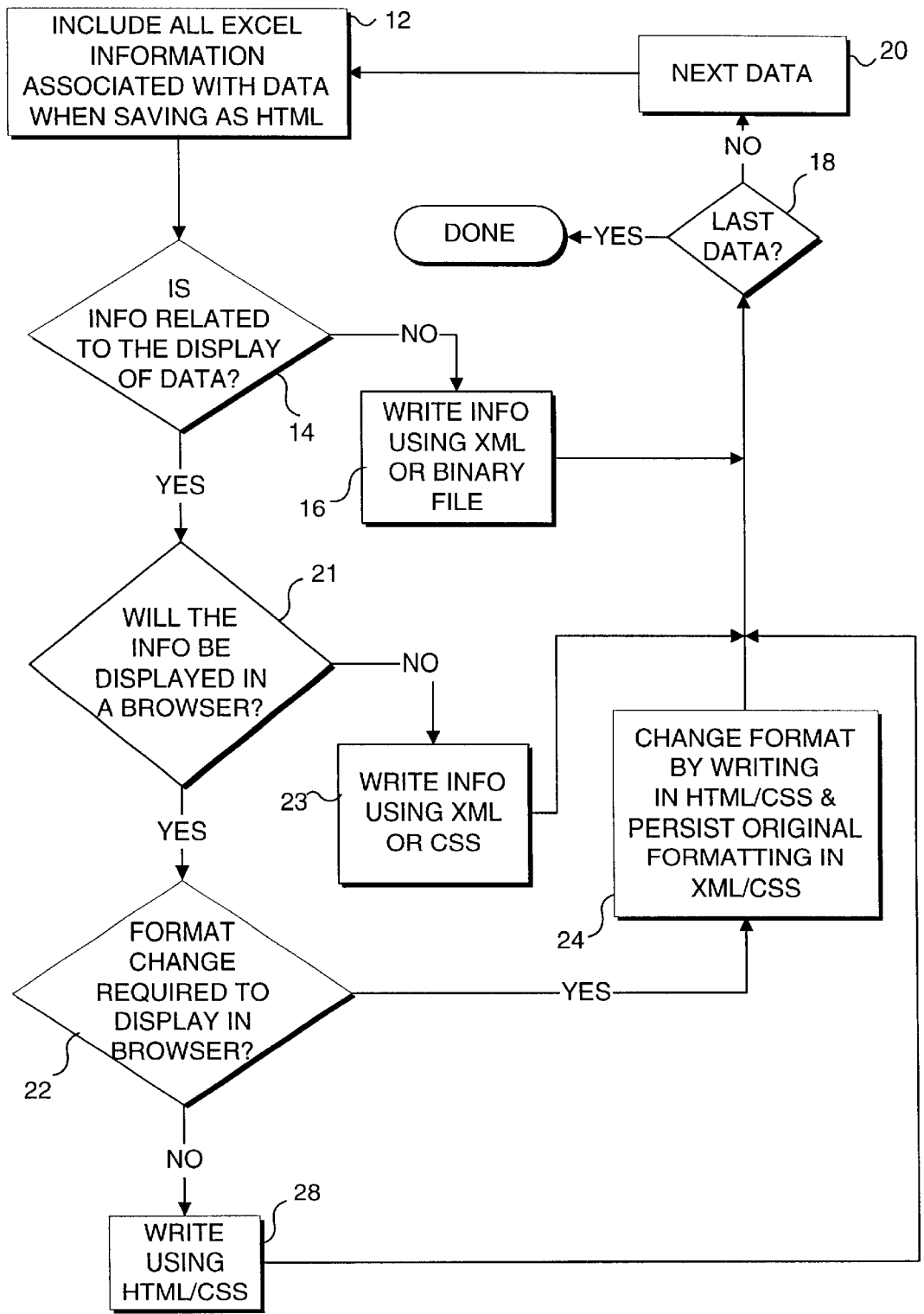
FIG. 1 is a flow chart illustrating how data are saved by a spreadsheet program into an HTML document, in accord with the present invention.

The present invention will be included in Microsoft Corporation's EXCEL 2000 spreadsheet program, which will also be distributed by as part of Microsoft's OFFICE 2000™ product line. As implemented therein, the present invention ensures that data or a table created in the spreadsheet program and saved as an HTML document includes within the HTML document all information necessary so that the HTML document can both be viewed by a network user, and if the EXCEL 2000 spreadsheet program has been installed on the user's computer or is accessible by the user on a local area network, the data or table can be manipulated with the same functionality as if the data or a table had been saved in the EXCEL 2000 spreadsheet program file format. The roundtripping concept of the present invention allows the data displayed with a browser program to be returned to a spreadsheet by the EXCEL 2000 spreadsheet program without loss of format and functionality. The prior art has allowed users to insert data tables into HTML documents; however, data tables thus inserted into an HTML document did not consistently retain all formatting information associated with the data table and did not retain all functionality of the original data when returned to the parent spreadsheet program.

Before explaining how these features are implemented, it will be helpful to define several terms. The term "HTML document" as used herein and in the claims that follow means a file or a group of related files that include HTML content, which is intended to be viewed or displayed with a Web browser program. The HTML document may be a new HTML document created when a file from a parent spreadsheet application is translated into HTML format, or the HTML document may be an existing HTML document to which the new data content is added from a spreadsheet program. The term "data" as used herein and in the claims that follow means any information produced by a spreadsheet program, such as tables, charts, or images. The following example of one preferred embodiment of the present invention is disclosed in regard to its use in Microsoft Corporation's EXCEL 2000 spreadsheet program; however, it is not intended that the invention be limited to this program, since it can also be applied to other types of applications. While it is understood that it preferable to use a trademark such as EXCEL 2000 as an adjective in connection with the type of product to which it is applied, for simplicity, all further references to this program in the following description will simply refer to this program as "EXCEL 2000," omitting reference to the term "spreadsheet program" and the "™" symbol.

HTML is a relatively simple language used to create hypertext documents that are portable from one computer platform to another. The XML describes a class of data objects, which are stored on computers, and partially describes the behavior of programs that process these objects. XML is a subset or restricted form of the Standard Generalized Markup Language (SGML) (ISO 8879). The goal of XML is to enable generic SGML to be served, received, and processed on the Web or other network in the way that is now possible with HTML. XML has been designed for ease of implementation and for interoperability with both SGML and HTML and customizes SGML in a number of significant ways. First, a specific choice of syntax characters was made by the specification designers so that everyone using XML will use the same; well-defined syntax. For example, all start tags used to identify elements of an XML file must begin with "<" and end with ">". Second, a new "empty-element" tag may be used to indicate that a current element is an empty element and that an end tag is not expected. This new empty-element tag is "/>". Third, tag omission is not allowed as it is in SGML, so that each non-empty element will have both a start tag and an end tag. XML was developed by the SGML Editorial Board formed under the auspices of the World Wide Web Consortium (W3C) beginning in 1996 and has been reviewed and approved by the members of the W3C, and is therefore deemed "stable" and ready for widespread deployment. The XML specification can be found by linking to http://www.w3.org/TR/1998/REC-xml-19980210 on the Internet.

CSS is a style sheet language that can be applied to HTML to control the style of a document, e.g., by indicating the fonts and colors to use, how much white space to insert, etc. Authors can attach styles to their HTML documents, and the styles are placed either in the HEAD of an HTML document (although they can also be placed in the BODY), or are placed in a separate file linked to the HTML document via hypertext. The basic format of the STYLE tag is:

<STYLE TYPE="text/css">

HTML tag.class {special formatting} </STYLE>

Further details regarding CSS may be found at the W3C web site. The following HTML document, available on the Internet, represents the W3C's recommended standard for CSS: http://www.w3.org/TR/REC-CSS1.

The present invention makes use of HTML, XML, and CSS to incorporate all the information necessary for roundtripping when a spreadsheet entity is saved into the HTML document. In general, HTML is used for cell data type information that is displayed in a browser program as well as in an EXCEL 2000 Worksheet, CSS are used for defining cell-level properties of the data, and XML is used for information that is not displayed in the browser program, but which is necessary for persisting some functionality for return of the data into EXCEL 2000, including document-level properties of the original spreadsheet. The term document-level properties refers to properties that apply to an entire data table (worksheet) or workbook. Range-level properties refer to properties that apply to multi-cell ranges, but not an entire data table or worksheet. For simplicity, it should be understood that in the following discussion and the claims the use of the term document-level properties will include range-level properties as well.

EXCEL 2000 data are organized in a file structure referred to as a workbook. Each workbook may have a plurality of worksheets (individual spreadsheets). A single EXCEL 2000 file can contain many types of data, including one or more spreadsheets, graphics such as charts, formatting information, and information relative to specific EXCEL 2000 features. When the complete contents of such a file are translated into HTML (as opposed to translating merely a table of data), as is required for roundtripping, a collection of files, such as HTML, graphics, and binary are generated. This collection of files, which represents the entire contents of a file originally created (or saved) in the EXCEL 2000 file format, will be collectively referred to as a roundtripable HTML document. Further details of the structure of this roundtripable HTML document are discussed below.

A data table being translated from an EXCEL 2000 workbook file format into an HTML document will employ HTML to the extent possible. Generally, the kind of information that can be represented by HTML includes formatting unique to a single cell and simple cell data, and this kind of information has already been successfully roundtripped in the prior art. For example, if a cell includes the numerical value "5," it will readily translate into HTML, and can readily roundtrip. Standard HTML is thus used during the translation of a spreadsheet entity into an HTML document whenever possible.

Cell-level properties (such as font, color, background, number formatting, alignment, borders, etc.) of the EXCEL 2000 spreadsheet data being saved into an HTML document are incorporated by using CSS to define the properties. When possible, standard CSS properties are used; however, if no such property exists, a custom CSS property is created.

While this type of information can sometimes be incorporated into an HTML document using HTML instead of CSS, the amount of HTML required to define the properties for a plurality of cells having the same formatting can be significantly reduced by controlling the appearance of those cells using CSS rather than the using HTML tags or attributes. For example, if a particular group of cells are to be displayed using a blue color font and a particular typeface such as "Arial 12 pt", one could certainly express that information using basic HTML. However, it would be necessary to include HTML defining these properties for each and every cell. CSS allow the same formatting information for each cell to be written out in long form once (either in a specific portion of the HTML document, or in a separate document linked to the HTML document in question), and then very briefly reference the CSS style for each individual cell having that formatting applied to it. Thus, CSS offers a convenient way to reduce the size of an HTML document (roundtripable or not) and to improve the performance of a browser program when the HTML document is displayed.

The present invention also uses CSS when the formatting used in an EXCEL 2000 spreadsheet is not supported by a browser program, and the cell formatting must be changed so the cell data will be properly displayed within a browser program. When this situation occurs, a mechanism must be included so that such formatting changes can be reversed when the roundtripable data in an HTML document is opened in EXCEL 2000. The example noted above in the Background of the Invention illustrates the problems when roundtripping spreadsheet formatting that is not supported in HTML. As explained therein, a red color font may applied to a number in an EXCEL 2000 spreadsheet cell to indicate that the value is negative, in accord with user selected Number Formatting Rules. However, a value may be shown in a red color font in another cell of the spreadsheet simply because the user arbitrarily selected red formatting for the font in that cell. When such a spreadsheet was translated to an HTML document in the prior art, the functional formatting indicative of a negative value was lost. Although any values that were in a red font in the spreadsheet cells also appeared in a red font in the translated data within the HTML document, the association between a negative value and the red font was lost in those cells where this functionality existed in the original spreadsheet. If the data in the HTML document were reintroduced back into a spreadsheet, the negative values that were in red font were not recognized, but instead, were simply treated the same as the values that were arbitrarily displayed with a red font. In contrast, the present invention retains this functionality, so that the negative values of the roundtripped data are again recognized when the data are returned to an EXCEL 2000 spreadsheet.

Since there is no existing CSS property that addresses the problem of this example, a new CSS property, MSO-Ignore, was created to successfully roundtrip such formatting. MSO-Ignore enables EXCEL 2000 to differentiate between EXCEL 2000 parented data in an HTML document that should be displayed in EXCEL 2000 as a red font all the time and EXCEL 2000 parented data in an HTML document that should be displayed in EXCEL 2000 as a red font only if certain criteria (e.g., for negative values) are met. When a roundtripable HTML document contains EXCEL 2000 parented data that should be displayed in EXCEL 2000 as a red font only if certain criteria are met, the MSO-Ignore property instructs EXCEL 2000 to "ignore" the HTML and CSS formatting information that indicates the cell data should be displayed as red all the time. The following two exemplary HTML snippets should clarify these points.

EXAMPLE 1

If an EXCEL 2000 user has defined the font color to be red and the background to be blue in one or more cells at all times by using a direct formatting command, then a CSS class containing the formatting information would be created, and that class would be referenced within the table. The resulting HTML data would be:

| {PRIVATE}1. | <HTML> |
| --- | --- |
| 2. | <HEAD> |
| 3. | <style> |
| 4. | .xl1{color: red; background: blue;} |
| 5. | </style> |
| 6. | </HEAD> |
| 7. | <BODY> |
| 8. | <table> |
| 9. | <tr> |
| 10. | <td class=xl1> |
| 11. | cell is red with blue background |
| 12. | </td> |
| 13. | </tr> |
| 14. | </table> |
| 15. | </BODY> |
| 16. | </HTML> |

EXAMPLE 2

If an EXCEL 2000 user has defined the font color of a cell to be red whenever a number is negative and black when it is positive by using a number format, the resulting HTML data would be:

| {PRIVATE}1. | <HTML> |
| --- | --- |
| 2. | <HEAD> |
| 3. | <style> |
| 4. | .xl1{mso-number-format: #,##0_);[Red](#,##0);} |
| 5. | </style> |
| 6. | </HEAD> |
| 7. | <BODY> |
| 8. | <table> |
| 9. | <tr> |
| 10. | <td class=xl1><font color=red style='mso-ignore:color'> |
| 11. | −5 |
| 12. | </font> |
| 13. | </td> |
| 14. | </tr> |
| 15. | </table> |
| 16. | </BODY> |
| 17. | </HTML> |

The formatting specified on the FONT tag is due to Number Formatting. EXCEL 2000 preferably persists cell-level formatting using HTML or CSS and document-level, worksheet or workbook-level formatting using XML. Because Number Formatting is cell-level formatting, EXCEL 2000 will have persisted the Number Formatting information by writing that information in CSS when the data were translated from the EXCEL 2000 file format into a roundtripable form in the HTML document. When the roundtripable HTML data of the second example are opened in EXCEL 2000, "mso-ignore" and its value "color" are recognized and indicate to EXCEL 2000 that the COLOR on the FONT tag should be ignored. EXCEL 2000 will then use the Number Formatting information stored as CSS in a separate CSS file, or stored as CSS in the <HEAD> tag of the HTML document, and specified on the TD tag to recreate the original Number Formatting parameters.

The determination of whether the formatting information written as CSS is saved by incorporating the information in the <HEAD> section of the HTML document, or by saving the information as a separate file linked to the HTML document, is a function of whether the EXCEL 2000 data can be represented in a single file, or if multiple files are required. As mentioned above, when the complete contents of an EXCEL 2000 file are translated into HTML, as is required for roundtripping, a collection of files, such as HTML, graphics, and binary are normally generated. If an EXCEL 2000 data selection contains only a single worksheet, and no images or other data that require the generation of a separate supporting file, that single worksheet can be roundtrip-ably translated into an HTML document by generating only a single HTML file. In that case, the formatting information saved as CSS will be incorporated into the <HEAD> section of the HTML document. If the EXCEL 2000 data selection includes more than one worksheet, or a single worksheet that requires supporting files (such as shape or image data), then the formatting information saved as CSS will be saved as a separate file linked to the <HEAD> section of the HTML document.

Regardless of whether existing CSS properties or newly created CSS properties are used to persist formatting information, EXCEL 2000 incorporate the CSS information either as a separate file linked to the HTML document, or by writing the information in the <HEAD> section of the HTML document containing the translated roundtripable EXCEL 2000 data.

If the EXCEL 2000 information has no correlation with anything that will be displayed in a browser program, that information is written in XML and incorporated into the HTML document. XML is also used to persist document-level properties, such as Conditional Formatting. Generally, information written in XML is incorporated into the <HEAD> section of the HTML document. It should be noted that PivotTable data stored in the XML-Data format can describe very large database table row-sets, and for optimization purposes this data is preferably stored as a separate file, even when a single HTML file could have been generated.

XML is an extension of HTML and does not affect the ability of the HTML document to be displayed in a browser program. Any XML not recognized by a browser program will simply be ignored, but will enable information required for functionality in EXCEL 2000 to be retained by the roundtripable data within the HTML document. This method of persisting information can be used for non-formatting information that has no HTML equivalent. The XML simply stores the information for EXCEL 2000 to use when the roundtripable data from HTML document is loaded back into EXCEL 2000. An example of the type of information that will be persisted in XML is a non-browser related property of an EXCEL 2000 workbook or worksheet, such as a user-defined sort.

EXCEL 2000 has many different sorting features that enable a user to sort through the data in a spreadsheet in different ways. Once defined, these sort routines can be saved as part of an EXCEL 2000 file, so that a particular sort routine does not need to be continually redefined. As a default, EXCEL 2000 stores the last sort executed. The user-defined sorting operation that is part of the EXCEL 2000 data are persisted in an HTML document by writing the information as XML. This information is ignored by a browser program, but is available to EXCEL 2000 when the roundtripable data from the HTML document is loaded back into EXCEL 2000, so that the user-defined sorting operation does not need to be redefined.

Assume that an EXCEL 2000 data table contains the names and release dates of animated features. A common sort for such a data table would be to arrange the names (column A) in ascending order. The following example illustrates how such a sort will be persisted in a roundtripable HTML document by using XML.

EXAMPLE 3

| {PRIVATE}1. | <HTML> |
| 2. | <HEAD> |
| 3. | <TITLE>Animated Features</TITLE> |
| 4. | <STYLE> |
| 5. | .xl1 . . . |
| 6. | </STYLE> |
| 7. | <XML> |
| 8. | <Sorting> |
| 9. | <Sort>Column A</Sort> |
| 10. | <CaseSensitive/> |
| 11. | </Sorting> |
| 12. | </XML> |
| 13. | </HEAD> |
| 14. | </HTML> |

It should be noted that EXCEL 2000 spreadsheets may include data that are not related to the display of a data table in a browser program, but which are either difficult to write in XML, or which if written into XML would provide no benefit. XML is a text-based language. Data are written into XML as text, and thus that data can be easily reviewed. The following EXCEL 2000 data cannot or should not be represented using a text format such as XML: Pictures or image data, OLE Objects, and Visual Basic data. Such data, when required for roundtripping, are saved as separate binary files, and the HTML document containing the translated EXCEL 2000 will link to those separate files.

The general logic employed by the present invention for including all of the data and information required by EXCEL 2000 in an HTML document is shown in a flow chart 10 in FIG. 1. In flow chart 10, it is assumed that an EXCEL 2000 workbook having one or more worksheets (spreadsheets) is open and that the user is saving data (such as a data table) from a spreadsheet into an HTML document.

It is important to note that the data in EXCEL 2000 include not only the data table itself, but information associated with that data table, which are related to particular EXCEL 2000 features, such as the parameters of the last sort executed by the user. To ensure that the HTML document can persist the manipulation of that data in EXCEL 2000, it is necessary to include within the HTML document all of the data and information that would be included within a file saved in the EXCEL 2000 file format, as shown in a block 12. That data and information will include elements not normally included within an HTML file, since some elements are not required to display the data in a browser program (such as the parameters of the last sort executed in EXCEL 2000). The next step in the logical process is shown in a decision block 14, in which EXCEL 2000 determines if the instant data are information related to the display of data.

If the instant data are not related to the display of data, then that information is written in XML and included within a separate but linked file (for PivotTable data), or incorporated into the <HEAD> section of the HTML document being written. As noted above, certain types of non textual information, such as OLE objects and Visual Basic data cannot or should not be represented as XML, and are saved as binary files referenced by the HTML document. The logic then proceeds to a decision block 18, in which EXCEL 2000 determines if there is more data. If not, the process is complete. If there are more data, the logic proceeds to a block 20 to process the next data from the spreadsheet, and from there the cycle repeats, starting at block 12.

If in decision block 14 the logic determines that the instant data are information related to the display of data, then the logic proceeds to a decision block 21, in which EXCEL 2000 determines whether the information is related to the display of data that can be displayed in a browser program (as opposed to data that is displayed only in EXCEL 2000). If the information is not related to the display in a browser program, the logic proceeds to a block 23, in which EXCEL 2000 incorporates the information into the HTML document using XML and CSS. As noted earlier, XML is used for document-level properties, and CSS are used for cell-level properties. The logic then proceeds to decision block 18, as described above.

If in decision block 21 the logic determines that the instant data will be displayed in a browser program, the logic proceeds to a decision block 22, in which EXCEL 2000 determines whether there is a formatting conflict between how the data are displayed in EXCEL 2000 versus how the data are displayed in a program. The issue relating to Number Formatting as discussed above is one such example. Other examples of such formatting conflicts include spilled text (an EXCEL 2000 feature in which text seems to extend into adjacent cells, but is stored in a single cell), shape and image data, and EXCEL 2000 user-defined Conditional Formatting. If there is a formatting conflict, the logic proceeds to a block 24 in which EXCEL 2000 resolves the conflict, ensuring that the data are translated into HTML such that a browser program will properly display the data. At the same time, EXCEL 2000 also persists the original formatting that the data exhibited in EXCEL2000, so the original formatting can be recreated when the data of the HTML document are opened in EXCEL 2000.

The original formatting is persisted in two ways. If the formatting conflict is due to document-level properties, or properties which apply to a range of cells, the original formatting is persisted by writing the EXCEL 2000 formatting into XML. Conditional Formatting rules fall into this category. Such formatting rules are essentially parameters that vary some property of the document or a range of cells, based on a user-defined parameter. For example, a user can specify that the font used for a cell or a range of cells will be black for values less than a specific number and blue for values equal to or greater than that number. A browser program will properly display the color as either blue or black for the values inserted into the HTML document, but HTML provides no mechanism for changing the cell color as a function of the value of the cells. This type of formatting information is persisted by writing the information in XML, where it will be ignored by the browser program, yet be available t when the data in the HTML document are roundtripped into EXCEL 2000.

Preferably, EXCEL 2000 uses CSS to define cell-level properties, and thus, to define cell-level formatting. Whenever EXCEL 2000 determines that the formatting of a cell needs to be changed so that the data in that cell can be properly displayed by a browser program, EXCEL 2000 will include the MSO-Ignore property as discussed above, in the HTML that describes that changed formatting, and EXCEL 2000 will include the original EXCEL 2000 formatting in the HTML file using CSS (or XML for document-level properties). When loading the data from HTML document into EXCEL 2000, if the MSO-Ignore property is found, the cell formatting used by the browser program will be discarded and the formatting persisted as CSS (or XML) will be used instead. The CSS (or XML) is included in a separate but linked file or in the <HEAD> section of the HTML document, as described above. Once EXCEL 2000 has resolved the formatting conflict and persisted the data's original EXCEL 2000 formatting information in block 24, the logic proceeds to decision block 18.

If at decision block 22, EXCEL 2000 determines that there is no formatting conflict, the logic proceeds to a block 28, and EXCEL 2000 translates the data into HTML. Note that any cell-level properties will be written using CSS, and the HTML will refer to., that property instead of defining the property using HTML tags or attributes. Whenever possible standard HTML is used. EXCEL 2000 uses in-line XML, also called namespace extensions, when required, as for the EXCEL 2000 features of formulas and autofilter. An example of the HTML for a formula is given below.

EXAMPLE 4

| Revenues | Expenses | Profit |
|---|---|---|
| 1000.00 | 750.00 | 250.00 |

| {PRIVATE}1. | <TABLE> |
| 2. | <TR> |
| 3. | <TD>Revenues</TD> |
| 4. | <TD>Expenses</TD> |
| 5. | <TD>Profit</TD> |
| 6. | </TR> |
| 7. | <TR> |
| 8. | <TD>1000.00</TD> |
| 9. | <TD>750.00</TD> |
| 10. | <TD x:FMLA="=a2–b2">250</TD> |
| 11. | </TR> |
| 12. | </TABLE> |

Once the data has been translated into HTML, the logic proceeds to decision block 18.

Figure 2:
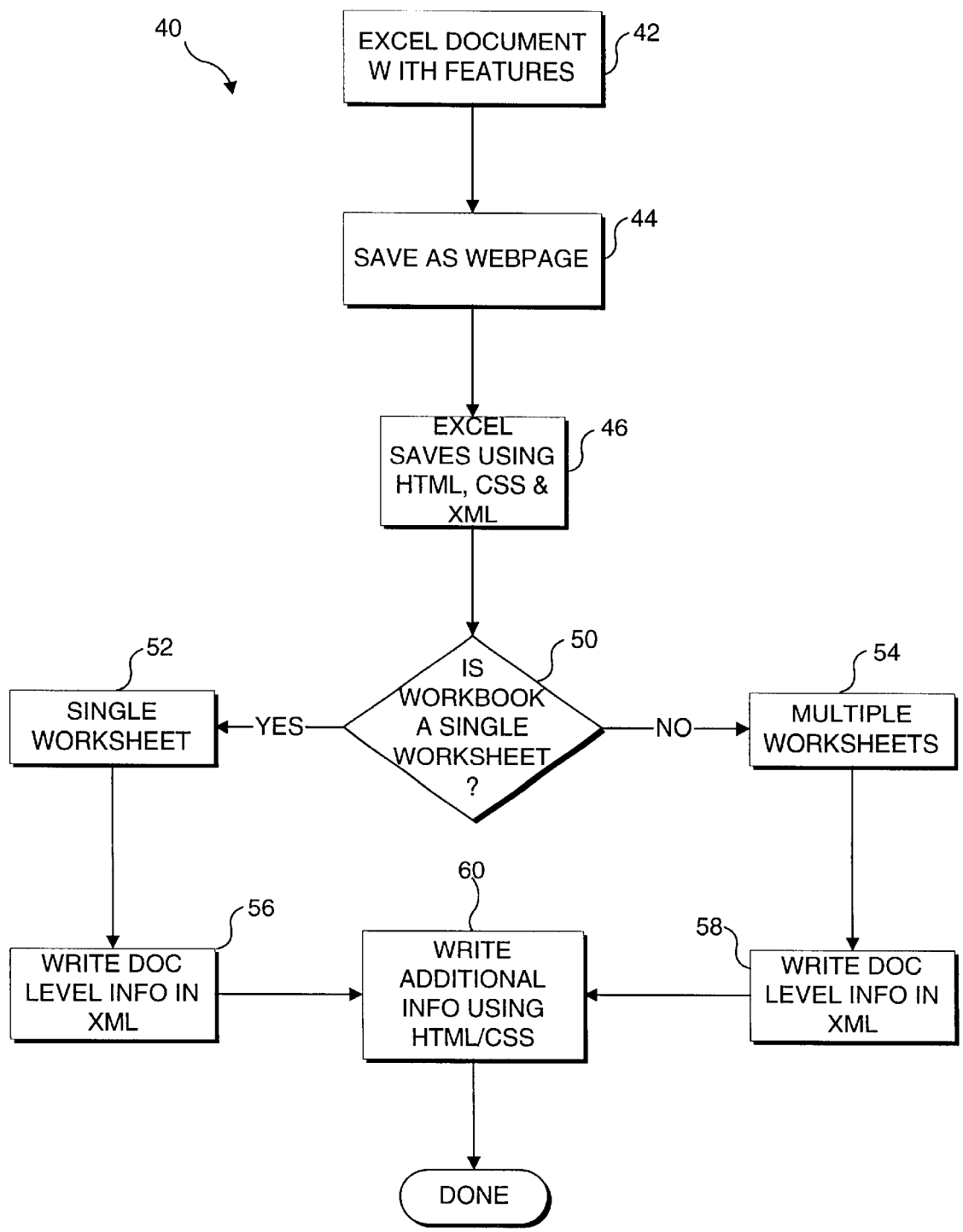
FIG. 2 is a flow chart illustrating the logical steps implemented to save a spreadsheet workbook, which can include multiple worksheets, as an HTML document, in accord with the present invention.

FIG. 2 illustrates the logical process followed to insert EXCEL 2000 data included in one or more worksheets into an HTML document, including all the data and information required to enable the HTML document to support the manipulation of the data when opened in EXCEL 2000, in accord with the present invention. As noted above, EXCEL 2000 data are organized in a file structure referred to as a workbook. Each workbook may have a plurality of worksheets, or spreadsheets. FIG. 2 and the following discussion provide details on how one preferred embodiment of the present invention, as exemplified in EXCEL 2000, inserts data from such a file structure into HTML documents.

The process starts at a block 42, where it is assumed that a user has an open EXCEL 2000 document that includes one or more EXCEL 2000 features (such as Conditional Formatting, or Number Formatting). The logic proceeds to a block 44, where it is assumed that the user decides to save the EXCEL 2000 document as a Web page or into a Web page. The logic proceeds to a block 46, in which EXCEL 2000 initiates the process of saving the spreadsheet data in the HTML format, using HTML, XML and CSS. EXCEL 2000 will save a table created by the user including all formatting, formulas, and names associated with the table. Saved features include Cell Formatting, Conditional Formatting, Data Validation, Formulas, Names, Outlining and Grouping, Pivot Tables, and Sorting. Preferably, EXCEL 2000 does not save user custom formatting, which has been defined but not used.

Whenever possible EXCEL 2000 uses existing HTML tags to save the spreadsheet data into the HTML document. Features that have an HTML equivalent are saved using the appropriate attribute/value pair. Inline XML or namespace extensions have been developed for specific features, including Autofilter and formula (as noted above). Preferably, cell-level formatting information is saved using style tags, as a separate but linked CSS file or in the header section of the HTML document. For single sheet workbooks, style information is stored in the header. For multi-sheet workbooks, the style information, including the default cell formatting and class definitions, is stored in a separate CSS file having the name of "stylesheet.css".

EXCEL 2000 assigns a class name to each unique combination of formatting. Without classes, formatting could be written in standard HTML, but such an approach would increase the file size, as formatting information written in standard HTML is done per cell, and would often be duplicated. Classes can be called for a single cell (TD), or for a group of cells (TR, COL, TABLE). The use of classes allows multiple formatting combinations to be called with a minimal amount of code. The class names for cell formatting are numbers generated by EXCEL 2000 preceded by the letters "XL." CSS requires that names be preceded by a period in the class definition. The class name is-followed by the appropriate style properties using the syntax:

.XL1 {numberformat: something; border:thick}
.XL2 {numberformat: something}
.XL3 {numberformat: somethingelse; border:thick}
.Style1 {msoffice-style-name: CoolStyle; font family: comic sans; font size: 9 pt; border: 3 pt double green }
.font1 {font-weight:bold; font-size: 12 pt}

Whenever possible existing CSS properties are used. In certain cases, the roundtripping of EXCEL 2000 features requires the creation of a new property. One such property is the MSO-Ignore property, which has been described in reference to FIG. 1.

More complex features that require multiple records map well to XML. XML is also used for information that is not used by the browser program, but is still required to be included in the HTML document to support the manipulation of the data when roundtripped into EXCEL 2000. EXCEL 2000 uses XML to store features such as Conditional Formatting, Sorting, Data Validation and PivotTable information with the corresponding worksheet. Preferably, PivotTable information is always stored in a separate but linked file, while other XML data are stored either in a separate but linked file or in the header of the HTML document, as described above.

As noted earlier, certain EXCEL 2000 features require information to be stored separately in a binary file. Examples of these features include Visual Basic data and OLE objects.

The next step after block 46 in which EXCEL 2000 initiates saving using HTML, XML and CSS are a decision block 50, in which EXCEL 2000 determines whether the workbook includes more than one worksheet. Often, EXCEL 2000 users generate data comprising only a single worksheet. If the data to be saved as an HTML document is a single worksheet, the logic proceeds to a block 52.

In this case, a single *.htm file will include the data from the spreadsheet. It should be noted that EXCEL 2000 will save a workbook as a single HTML file if the first worksheet tab in the workbook contains data. If any other worksheet contains data, or a blank sheet exists before the sheet with the data that is being saved into an HTML document, the workbook is saved as a frame-set (as is described below in conjunction with a block 54). Also in block 52, EXCEL 2000 looks at the data for any document-level properties. Two examples of document-level properties are Conditional Formatting and information regarding sorting.

It should be noted that an HTML document can describe a single worksheet, as well as referencing supporting files, such as those for images (*.gif), binary files (to roundtrip specific EXCEL 2000 features as described above), a document-level properties file (XML), or a style file (CSS). In some occasions there will be no need for supporting *.gif files or binary files. It is in this instance that the XML and CSS will be included in the <HEAD> section rather than as separate linked files, so that a single HTML file can be used to represent the spreadsheet. Whenever the HTML document includes more than one worksheet, or requires binary or image supporting files, or a separate but linked file containing PivotTable data written as XML, an "overview file" is created that contains a directory of all the supporting files.

The logic will then proceed to a block 56, at which point EXCEL 2000 writes the document-level properties into XML, either into a document properties file linked to the <HEAD> section of the *.htm file, or in the <HEAD> section of the HTML document itself, as described above. Once the document-level properties have been written, the logic proceeds to a block 60, in which EXCEL 2000 writes the cell-level properties, and any other additional information using HTML and CSS (as discussed above). Once all the cell data and additional data have been included in the HTML document (and any files that it references), the process is complete.

If at decision block 50 EXCEL 2000 determines that the selected workbook includes multiple worksheets, the logic proceeds to block 54. When the EXCEL 2000 data include more than one worksheet, the workbook will be represented in HTML as a frame-set that includes two frames—a worksheet frame and a sheet navigation (tabs) frame. The frame-set produced will include:

| | |
|---|---|
| MyWorkbook.htm | Workbook Frame-set HTML file (main document, i.e., what user selects). |
| Sheet*.htm | Worksheet HTML files (one per worksheet, Sheet1.htm, Sheet2.htm, etc). |
| Tabstrip.htm | Worksheet navigation HTML file containing tabstrip user interface and links to Sheet*.htm files. |

The user specified filename replaces MyWorkbook. For each additional file created as part of the save process, the filename is the workbook name followed by an underscore and a unique identifier. For worksheets, the identifier is the sheet name (Sheet1, Sheet2, etc.); for objects, the object name is used (chart1). The main HTML file (e.g., MyWorkbook.htm) is saved in the specified location. A sub-folder is created containing the supporting files, including the Sheet*.htm files. Saving a workbook with three worksheets creates, for example, "MyWorkbook.htm" in the destination folder, along with a sub-folder called, for example, "MyWorkbook$_{13}$ files," which includes "Sheet001.htm," "Sheet002.htm," "Sheet003.htm" and any other required additional files, such as "Chart001.htm." Preferably, supporting files' names are prefixed by the book name if the files are not organized in the folder named "MyWorkbook$_{13}$ files". If they are organized in a folder, their names don't have "MyWorkbook" prefix.

The frame-set file, "MyWorkbook.htm," contains workbook-level information, links to supporting documents/files, and the frame-set definition. The frame-set definition includes two frames; the worksheet frame and the navigation frame. The worksheet frame contains the current worksheet HTML file, while the navigation frame contains the HTML tab strip. There is a one-to-one mapping between sheets in the EXCEL 2000 workbook and worksheet HTML files (including blank worksheets). As noted above, workbook properties are written into XML and incorporated into the <HEAD> section of MyWorkbook.htm, unless PivotTable data is included, in which case that information is written into XML as a separate file linked to the: <HEAD> section of the HTML document. These properties include information about the sheets of a workbook required to recreate all of the worksheets on load of the spreadsheet data from HTML document back into EXCEL 2000. The worksheet navigation frame contains MyWorkbook$_{13}$ tabstrip.htm, which provides navigation controls for each worksheet in the workbook. Clicking on a link loads the selected worksheet into the worksheet frame.

Worksheet files are thus accessed through the worksheet frame. A user could attempt to access a worksheet file directly (not through the worksheet frame) in a browser program, in EXCEL 2000, or in an HTML editor. In the first two cases, it is preferred that the user be redirected to the top-level workbook file, and EXCEL 2000 will do so. In the case of the HTML editor, EXCEL 2000 has no ability to alter this behavior. EXCEL 2000 includes script that redirects a user to the frame-set when the worksheet is opened outside of the worksheet frame. When the user attempts to open a worksheet file directly from within EXCEL 2000, the parent workbook will be opened with the specific worksheet as the current tab.

Returning to block 54, having determined that more than one worksheet is present in a workbook, EXCEL 2000 looks at the data for any document-level properties relating to the entire workbook or individual worksheets. The logic then proceeds to a block 58, in which EXCEL 2000 writes the document-level properties into XML, either in a separate file linked to the <HEAD> section of the HTML document, or in the <HEAD> section of the HTML document itself. As noted with respect to block 56 above, once the document-level properties have been written, the logic proceeds to block 60, in which EXCEL 2000 writes the cell-level properties using HTML and CSS. Once all of the cell data and any additional information have been written into the HTML document, the process is complete.

Figure 3:
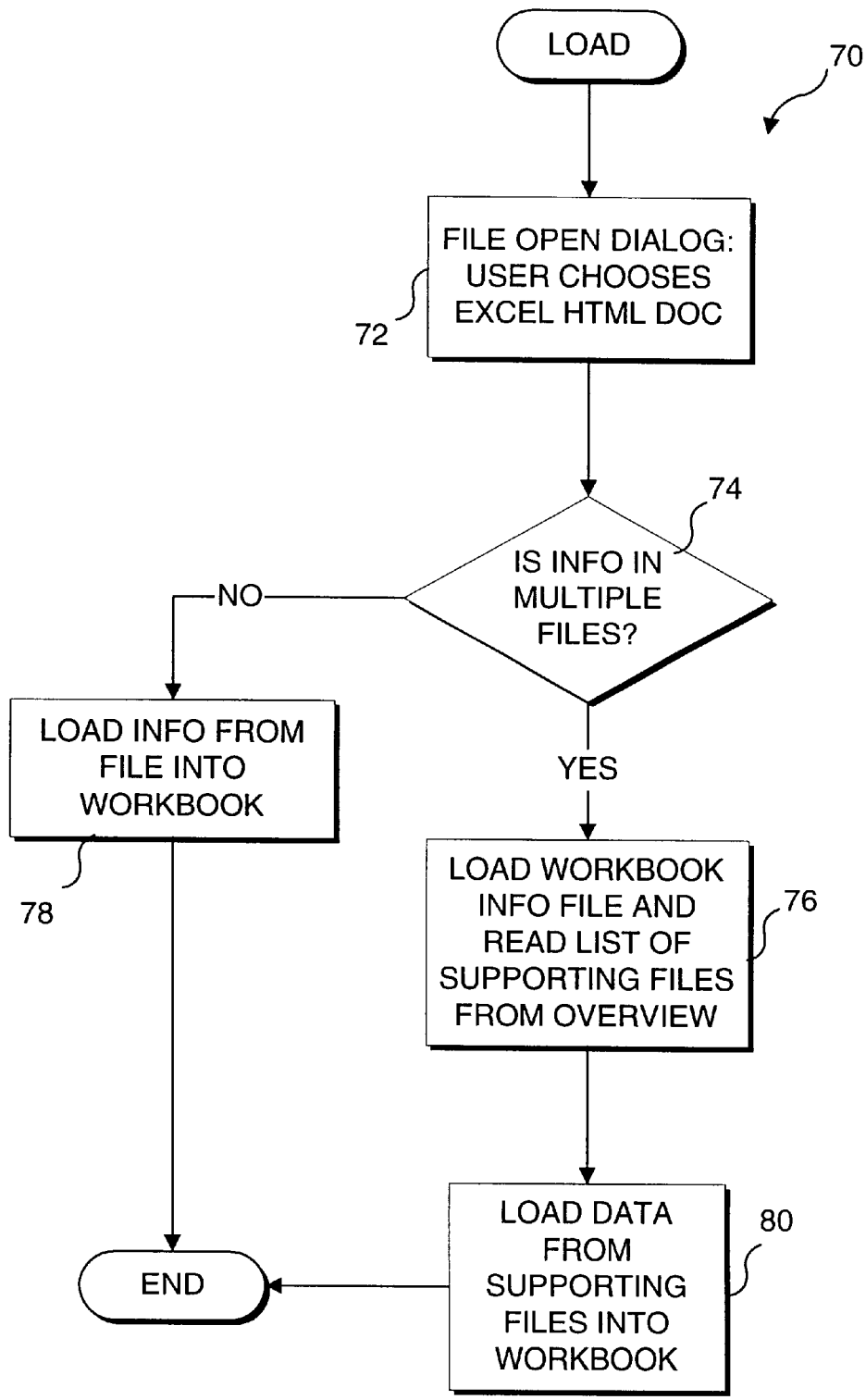
FIG. 3 is a flow chart diagram illustrating the logical steps implemented to open an HTML document that contains data originally translated from a spreadsheet, and to reintroduce the data back into a spreadsheet, in accord with the present invention.

FIG. 3 illustrates the logical steps followed when accessing spreadsheet data from within an HTML document using EXCEL 2000. The process begins at a block 72 in which a user selects the open HTML document menu option in EXCEL 2000. The logic then proceeds to a decision block 74, in which EXCEL 2000 determines whether the HTML document contains an overview file with supporting files, as described above in relation to saving EXCEL 2000 data into an HTML document.

If at decision block 74, EXCEL 2000 determines that all of the required information is located in a single file, rather than a group of files, then the logic proceeds to a block 78 and loads the information from the HTML document into EXCEL 2000. In this case the EXCEL 2000 workbook will load only a single worksheet, and all of the table data are included in a single *.htm file, and no supporting files are linked to the HTML document. If an HTML document required only a single HTML file, the document-level properties (XML) and cell-level properties (CSS) will have been included in the <HEAD> section of the HTML file. EXCEL 2000 will have included this information in the <HEAD> section rather than a separate file when the spreadsheet data were originally inserted into the HTML document only if the spreadsheet data consisted of a single worksheet. Note that if the original EXCEL2000 data included images, or some feature that required a binary file to properly roundtrip the data, or PivotTables data, then supporting files will have been saved and linked to the HTML document, and in decision block 74 the logic would determine that the information is located in multiple files.

The spreadsheet data are delivered from the HTML document as a stream of data, i.e., the first line of data will correspond to the first row in an EXCEL 2000 spreadsheet. When the data from an HTML file are loaded into a spreadsheet, the data always starts in Column A. The spreadsheet data in an HTML document that was created by EXCEL 2000 may include the MSO-Ignore property. As described above, the MSO-Ignore property is used when the HTML formatting required to properly display the data in a browser program is inconsistent with the formatting required to properly display the data in EXCEL 2000. When loading the data back into a spreadsheet, EXCEL 2000 will "ignore" the HTML or CSS formatting referenced by the MSO-Ignore property and will instead use the original EXCEL 2000 formatting information persisted in the HTML document as XML (document-level properties) or as CSS (cell-level properties).

Once EXCEL 2000 has loaded the data from the single *.htm file as provided in block 78, the process is complete. Returning to decision block 74, if EXCEL determines that the workbook includes multiple worksheets (i.e., that the HTML document includes a frame-set) or a single worksheet with supporting files, the logic proceeds to a block 76. In block 76, EXCEL 2000 first recreates the workbook, using document-level properties persisted as XML either in a linked properties file or in the <HEAD> section of the HTML document, and then loads each worksheet (Sheet1.htm, Sheet2.htm, etc.), following the same procedures explained above with respect to block 78. Note that proper loading of the data may require the use of information in supporting files, such as a *.css file, an image file, a binary file, or an XML properties file. Information from these files is used as necessary to properly load the data table from the *.htm file (such as recreating formatting information persisted as CSS or XML and stored in separate, but linked files). After all the worksheets and/or other types of data have been loaded using the data in the multiple files, the logic proceeds to a block 80, in which any additional information which has not yet been loaded from the supporting files is loaded.

If EXCEL 2000 encounters a problem while loading data from an HTML document, an alert will be displayed to the user. Such an alert will occur when EXCEL 2000 cannot locate a needed file, such as a worksheet file, a workbook file, a CSS file, or an XML document properties file. If the missing file is a worksheet, EXCEL 2000 will insert a blank worksheet in its place. If the missing file is the workbook file, then each worksheet will be loaded as a separate workbook. If the missing file is a CSS or an XML document properties file, then EXCEL 2000 will use default settings as well as any formatting information within the HTML table data. Preferably, the user is advised of the particular file that is missing. A problem can also occur if tags are missing, corrupt, or invalid. In such a case, EXCEL 2000 will use the default value for a tag on load, and an error message will be displayed to the user.

Exemplary Operating Environment

Figure 4:
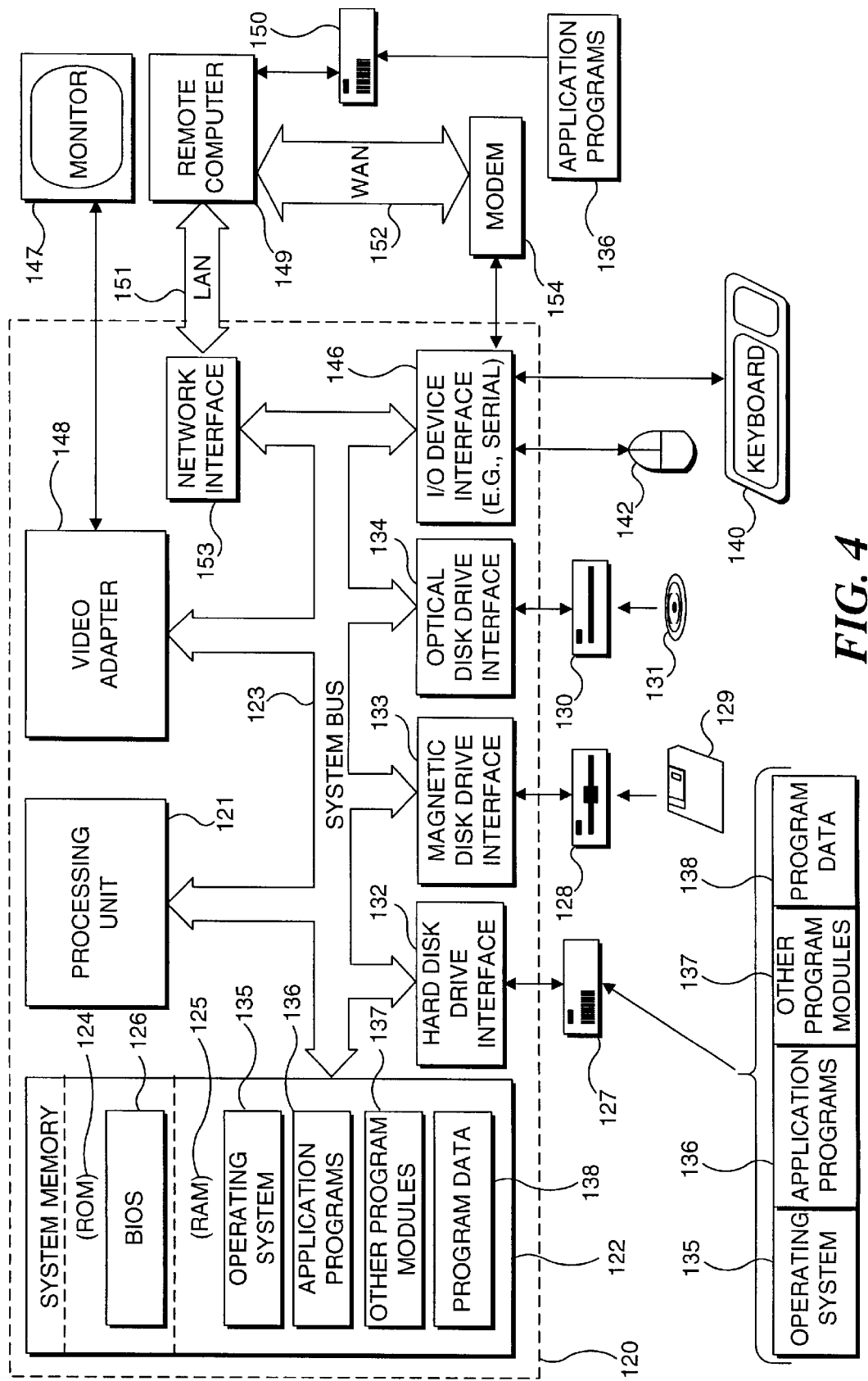
FIG. 4 is a block diagram of a personal computer system suitable for implementing the present invention.

FIG. 4 and the following discussion are intended to provide a brief, general description of a suitable computing environment in which the present invention may be implemented. As discussed above, a preferred embodiment of the roundtripping feature, which enables an HTML document to not only display data in a browser program, but to preserve the formatting and functionality of that data when returned to the parent spreadsheet program as well, is implemented as part of a spreadsheet program (e.g., EXCEL 2000) that is executed by a personal computer or workstation. The spreadsheet program comprises a plurality of program modules that include routines, programs, objects, components, data structures, etc., which perform particular tasks or implement particular abstract data types. Moreover, those skilled in the art will appreciate that the invention may be practiced with other computer system configurations, including hand-held devices, multiprocessor systems, microprocessor based or programmable consumer electronics, network personal computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 4, an exemplary system for implementing the invention includes a general purpose computing device in the form of a conventional personal computer 120, including a processing unit 121, a system memory 122, and a system bus 123 that couples various system components including the system memory to processing unit 121. System bus 123 may be any of several types of bus structures including a memory bus or memory controller, a peripheral bus, and a local bus using any of a variety of bus architectures. The system memory includes a read only memory (ROM) 124 and a random access memory (RAM) 125. A basic input/output system (BIOS) 126, containing the basic routines that helps to transfer information between elements within personal computer 120, such as during start-up, is stored in ROM 124. Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. The drives and their associated computer readable media provide nonvolatile storage of computer readable instructions, data structures, program modules, and other data for personal computer 120. Although the exemplary environment described herein employs hard disk 127, a removable magnetic disk 129, and a removable optical disk 131, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 127, magnetic disk 129, optical disk 131, ROM 124, or RAM 125, including an operating system 135, one or more application programs 136, other program modules 137, and program data 138. A user may enter commands and information into personal computer 120 through input devices such as a keyboard 140 and a pointing device 142. Other input devices (not shown) may include a microphone, joystick, game pad, satellite dish, scanner, or the like. These and other input devices are often connected to processing unit 121 through a serial port interface 146 that is coupled to the system bus, but may be connected by other interfaces, such as a parallel port, game port, or a universal serial bus (USB). A monitor 147 or other type of display device is also connected to system bus 123 via an interface, such as a video adapter 148. In addition to the monitor, personal computers typically include other peripheral output devices (not shown), such as speakers and printers.

Personal computer 120 may operate in a networked environment using logical connections to one or more remote computers, such as a remote computer 149. Remote computer 149 may be another personal computer, a server, a router, a network PC, a peer device, or other common network node, and typically includes many or all of the elements described above relative to personal computer 120, although only a memory storage device 150 has been illustrated in FIG. 4. The logical connections depicted in FIG. 4 include a local area network (LAN) 151 and a wide area network (WAN) 152. Such networking environments are commonplace in offices, enterprise wide computer networks, intranets, and the Internet.

When used in a LAN networking environment, personal computer 120 is connected to local network 151 through a network interface or adapter 153. When used in a WAN networking environment, personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device. It will be appreciated that the network connections shown are exemplary and other means of establishing a communications link between the computers may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for saving data having a format and functionality specific to a parent spreadsheet program into a hypertext markup language (HTML) document, such that the data are viewable with a browser program, and so that the data can be reintroduced into the parent spreadsheet program without loss of the format and functionality that the data previously exhibited in the parent spreadsheet program, comprising the steps of:
   (a) enabling a user to select the data from within the parent spreadsheet program;
   (b) incorporating the data from the parent spreadsheet program into the HTML document by:
      (i) using HTML to represent data that are displayable with a browser program;
      (ii) using Cascading Style Sheets (CSS) to represent cell-level properties of the data so as to minimize a code required to represent the data in the HTML document, as compared to using HTML to represent cell-level properties of the data; and
      (iii) using Extended Markup Language (XML) to represent information required for preserving the functionality of the data when reintroduced into the parent spreadsheet program, but which is not required for the display of the data with a browser program; and
   (c) saving representations of the data in HTML, CSS, and XML in at least one file, said at least one file including the HTML document.

2. The method of claim 1, wherein when the data includes multiple data tables, the step of saving the representations comprises the step of generating a separate HTML file for each different data table.

3. The method of claim 2, wherein the step of saving the representations further comprises the step of generating a frame-set that includes a navigation file with links to each file representing a different data table.

4. The method of claim 1, wherein the step of saving the representations comprises the step of generating at least one supporting file to which the HTML document is linked.

5. The method of claim 4, wherein the step of generating at least one supporting file comprises the step of including within a supporting file information required for proper functionality of the data when reintroduced into the parent spreadsheet program, but which is not required for the display of the data in a browser program.

6. The method of claim 5, wherein the supporting file contains information in one of a binary format and an XML format.

7. The method of claim 6, wherein the supporting file contains PivotTable data in an XML format.

8. The method of claim 4, wherein the step of generating at least one supporting file comprises the step of including image data in an image supporting file.

9. The method of claim 4, wherein the step of generating at least one supporting file comprises the step of including the cell-level properties of the data in a CSS supporting file.

10. The method of claim 1, wherein the step of using XML to represent information required for preserving the functionality of the data when reintroduced into the parent spreadsheet program comprises the step of using XML to define at least one of document-level properties of the data in the parent spreadsheet program and parameters of a last data sort that was executed in the parent spreadsheet program.

11. The method of claim 1, wherein the step of using XML to represent the information required for preserving the functionality of the data when reintroduced into the parent spreadsheet program comprises the step of including the XML within a head section of the HTML document.

12. The method of claim 1, wherein the step of using CSS to represent the cell-level properties of the data comprises the step of including the CSS within a head section of the HTML document.

13. The method of claim 1, wherein the step of using CSS to represent the cell-level properties of the data comprises the step of defining at least one of the properties of a font, a background, a color, a number formatting, a border of a cell, and an alignment of a value within a cell.

14. The method of claim 1, wherein the step of using CSS to represent cell-level properties of the data comprises the step of creating a new CSS property if a cell property of the data does not correspond to an existing CSS property.

15. The method of claim 1, wherein the step of using HTML to represent data comprises the step of using HTML to define a cell-level property if that property is unique to a sufficiently small number of cells so that an efficiency of representing the property using HTML is greater than an efficiency of representing the property using CSS.

16. The method of claim 1, wherein the step of using HTML to represent data comprises the steps of:
  (a) changing formatting of the data for at least one cell so that an appearance of the data when displayed by a browser program will be substantially identical to that of the data when displayed by the parent spreadsheet program; and
  (b) including in the HTML document or in a supporting file information relating to a format of the data when displayed by the parent spreadsheet program, such that the information is ignored by a browser program when the HTML document is display by a browser program, but used by the parent spreadsheet program to recreate the format of the data when reintroduced into the parent spreadsheet program.

17. The method of claim 16, wherein the step of changing the formatting of the data comprises the step of including an MSO-Ignore property with HTML related to the changed formatting, so that the changed formatting indicated by the MSO-Ignore property will be ignored by the parent spreadsheet program when the data are reintroduced into the parent spreadsheet program.

18. The method of claim 16, wherein the step of including the information related to the formatting of the data comprises the steps of using CSS to include information for a cell-level property, and using XML to include information related to a document-level property.

19. A method for reintroducing into a spreadsheet program, data that were originally created using the spreadsheet program and were subsequently included in a hypertext markup language (HTML) document, such that the format and functionality of the data thus reintroduced from the HTML document are substantially identical to an original format and functionality of the data when created in the spreadsheet program, comprising the steps of:
  (a) providing the HTML document into which the data originally created in the spreadsheet program and information related to the original format and functionality have been incorporated, such that:
    (i) the data originally created in the spreadsheet program are viewable with a browser program in which the HTML document is displayed;
    (ii) cell-level properties of the data originally created in the spreadsheet program are incorporated into the HTML document using Cascading Style Sheets (CSS); and
    (iii) the information related to the original format and functionality, but not related to the display of the data with a browser program, are incorporated into the HTML document using Extended Markup Language (XML);
  (b) enabling a user of the spreadsheet program to select the HTML document for reintroducing the data back into the spreadsheet program; and
  (c) providing substantially the original format and functionality of the data that are being reintroduced into the spreadsheet program by:
    (i) loading the data from the HTML document into the spreadsheet program;
    (ii) using the CSS from the HTML document to recreate the cell-level properties of the data loaded into the spreadsheet program from the HTML document;
    (iii) using the information related to the original format and functionality that was incorporated into the HTML document as XML to produce substantially the original format and functionality for the data loaded into the spreadsheet program from the selected HTML document; and
    (iv) applying the format and functionality thus produced and the cell-level properties to the data loaded into the spreadsheet program.

20. The method of claim 19, wherein the HTML document is linked to at least one supporting file, and wherein the step of producing the format and functionality within the spreadsheet program comprises the step of using the information in the at least one supporting file to produce the format and functionality for the data loaded into the spreadsheet program from the selected HTML document.

21. The method of claim 19, wherein the information related to the original format and functionality that is incorporated into the HTML document as XML includes at least one of a document-level property of the data as originally created in the spreadsheet program and parameters of a last data sort executed by the spreadsheet program before the data originally created in the spreadsheet program were included into the HTML document, and the step of producing the format and functionality within the spreadsheet program comprises the step of using the information related to the original format and functionality that was incorporated into the selected HTML document as XML to recreate at least one of the document-level property of the data originally created in the spreadsheet program and the parameters of the last data sort executed by the spreadsheet program.

22. The method of claim 19, wherein the data comprises a plurality of data tables in the HTML document, and the step of loading the data comprises the step of creating a separate worksheet for each data table in the HTML document.

23. A method for saving data created in a spreadsheet program into a hypertext markup language (HTML) document, so that the data are viewable in a browser program, and so that formatting information for the data that is required for full functionality of the data within the spreadsheet program is preserved, the method comprising the steps of:
  (a) enabling a user to select the data within the spreadsheet program that is to be saved into the HTML document;
  (b) separating the data into groups, including a first group of data that is not displayable by a browser program, but which is required for some functionality of the data within the spreadsheet program, a second group of data that is displayable by a browser program, with a substantially identical appearance to the data displayed by the spreadsheet program, and a third group of data displayable by a browser program, but requiring a formatting change so that the appearance of the data displayed by a browser program will appear substantially identical to that of the data when displayed by the spreadsheet program;

(c) incorporating the first group of data into the HTML document using Extended Markup Language (XML), such that the first group of data are ignored when the HTML document is displayed by a browser program, but is preserved and thus available to be used to reintroduce the data from the HTML document into the spreadsheet program;

(d) incorporating the second group of data into the HTML document such that:
  (i) cell-level properties of the data are incorporated into the HTML document using Cascading Style Sheets (CSS), when an amount of code required to incorporate the second group of data into the HTML document can be reduced by the use of CSS; and
  (ii) cell-level properties of the data are incorporated into the HTML document using inline HTML, when an amount of code required to incorporate the second group of data into the HTML document can be reduced by the use of HTML instead of CSS;

(e) incorporating the third group of data into the HTML document using HTML such that:
  (i) any formatting change required to display the data with a browser program includes a marker associated with the formatting change;
  (ii) information related to the formatting is incorporated into the HTML document, such that the formatting change is employed when the HTML document is displayed by a browser program, but is ignored when the third group of the data is reintroduced from the HTML document into the spreadsheet program;
  (iii) cell-level properties of the data are incorporated into the HTML document using Cascading Style Sheets (CSS), when an amount of code required to incorporate the second group of data into the HTML document can be reduced by the use of CSS; and
  (iv) cell-level properties of the data are incorporated into the HTML document using inline HTML, when an amount of code required to incorporate the second group of data into the HTML document can be reduced by the use of HTML instead of CSS; and (f) saving the HTML document incorporating the first group of data, the second group of data, and the third group of data in at least one file.

24. The method of claim 23, wherein the cell-level properties comprise at least one of a font, a background, a color, a number formatting, a border of the cell, and an alignment of cell data within the cell.

25. The method of claim 23, wherein the step of incorporating the first group of data into the HTML document using XML comprises the step of incorporating within the HTML document at least one of a definition of document-level properties of the data created in the spreadsheet program and a definition of parameters of a last data sort that was executed in the spreadsheet program.

26. The method of claim 23, wherein the step of incorporating the first group of data into the HTML document using XML comprises the step of generating at least one supporting file.

27. The method of claim 26, wherein the step of generating at least one supporting file comprises generating at least one of a binary file, an image file, and an XML file that defines document-level properties of the original spreadsheet document.

28. The method of claim 23, wherein the data created in the spreadsheet program includes multiple data tables, and the steps of incorporating the second group of data into the HTML document and incorporating the third group of data into the HTML document comprise the step of generating multiple files.

29. The method of claim 28, wherein the step of generating multiple files comprises generating a unique file for data from each data table.

30. The method of claim 29, wherein the step of generating multiple files further comprises the step of generating a frame-set, including a navigation file with links to each unique file representing a data table.

31. The method of claim 28, wherein the step of generating multiple files comprises the step of generating a CSS file in which cell-level properties of any of the first, second and third groups of data are defined.

32. The method of claim 23, wherein the marker is an MSO-Ignore property.

33. The method of claim 23, wherein the step of incorporating the third group of data into the HTML document using HTML comprises the step of including within the HTML document the information related to an original formatting of the data by using CSS to define cell-level properties of the original formatting and using XML to define document-level properties of the original formatting.

34. An article of manufacture adapted for use with a computer, comprising:
  (a) a memory medium; and
  (b) a plurality of machine instructions comprising a spreadsheet computer program, which are stored on the memory medium, said plurality of machine instructions when executed by a computer, causing the computer to:
    (i) enable a user to specify a data selection in the spreadsheet program to be saved into a hypertext markup language (HTML) document, such that the resulting HTML document can support both the display of the data in a browser program and preserves the format and functionality of the data so that the data in the HTML document can be opened in the spreadsheet program with the format and functionality that the data had when created in the spreadsheet program;
    (ii) separate the data into a first portion of the data that is related to both a feature in a browser program and in the spreadsheet program, and a second portion of the data that is only related to a feature of the spreadsheet program;
    (iii) incorporate the second portion of the data into the HTML document using Extended Markup Language (XML) to represent any of said second portion of the data that can appropriately be represented as text, using at least one binary file to represent any of said second portion of the data that cannot appropriately be represented as text, and including a link within the HTML document to said at least one binary file;
    (iv) incorporate the first portion of the data that is related to both a feature in a browser program and a feature in the spreadsheet program into the HTML document by using Cascading Style Sheets (CSS) to define cell-level properties of the data and by using HTML to represent the first portion of the data; and
    (v) save the HTML document including the HTML, CSS, and XML in at least one file.

35. The article of manufacture of claim 34, wherein the plurality of machine instructions, when executed by a computer, further cause the computer to:
  (a) identify any part of the data requiring a change to be made to enable said part of the data to be displayed in a browser program with an appearance that is substantially identical to an appearance of the data in the spreadsheet program; and (b) change the formatting of any part of the data so identified; and (c) incorporate within the HTML document the original formatting of any part of the data that was so changed, such that the original formatting is ignored by a browser program, but is available to be used by the spreadsheet program to recreate the format and functionality that the data had in the spreadsheet program when created therein.

36. A system for enabling a hypertext markup language (HTML) document to support both the display of data parented in a spreadsheet program in a browser program as well as the opening of that data with its original formatting and functionality intact, in the spreadsheet program, comprising:

(a) a memory in which a plurality of machine instructions defining the spreadsheet program are stored;

(b) a display; and (c) a processor that is coupled to the memory to access the machine instructions and to the display, said processor executing said machine instructions and thereby implementing a plurality of functions within the spreadsheet program, including:

(i) enabling a user to select the data within the spreadsheet program; and (ii) saving the data from the spreadsheet program into the HTML document by using HTML to represent data that are displayable with a browser program; using Cascading Style Sheets (CSS) to represent cell-level properties of the data to minimize an amount of code required to incorporate the data into the HTML document, and using Extended Markup Language (XML) to represent formatting information not required by a browser program, but required for opening the data from the HTML document with its formatting and functionality intact, within the spreadsheet program.

* * * * *